United States Patent
Lindskog

(10) Patent No.: US 11,743,858 B2
(45) Date of Patent: Aug. 29, 2023

(54) SYSTEM AND METHOD OF OPTIMIZING WIRELESS DEVICE RANGING

(71) Applicant: Samsung Electronics Co., Ltd., Suwon-si (KR)

(72) Inventor: Erik David Lindskog, Cupertino, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/458,222

(22) Filed: Aug. 26, 2021

(65) Prior Publication Data

US 2022/0095266 A1    Mar. 24, 2022

Related U.S. Application Data

(60) Provisional application No. 63/091,873, filed on Oct. 14, 2020, provisional application No. 63/086,527, (Continued)

(51) Int. Cl.
*H04W 64/00*    (2009.01)
*H04W 56/00*    (2009.01)
(Continued)

(52) U.S. Cl.
CPC .......... *H04W 64/006* (2013.01); *H04B 17/27* (2015.01); *H04L 43/106* (2013.01); *H04W 56/009* (2013.01); *H04W 64/003* (2013.01)

(58) Field of Classification Search
CPC ........ G01S 13/765; G01S 5/0205; G01S 5/10; G01S 1/20; G01S 11/06; G01S 13/75;
(Continued)

(56) References Cited

U.S. PATENT DOCUMENTS

| 11,447,099 B2* | 9/2022 | Ahmed | H04W 4/40 |
| 2013/0273935 A1* | 10/2013 | Amizur | G01S 5/10 |
| | | | 455/456.1 |

(Continued)

FOREIGN PATENT DOCUMENTS

| EP | 3584599 A1 | 12/2019 | |
| WO | WO-2017026976 A1 * | 2/2017 | H04W 56/00 |

(Continued)

OTHER PUBLICATIONS

European Extended Search Report for Application No. 21194293.3, dated Jul. 21, 2022.

*Primary Examiner* — Nathan S Taylor
(74) *Attorney, Agent, or Firm* — Renaissance IP Law Group LLP

(57) ABSTRACT

A method of performing ranging, by a first device, with respect to a second device is provided. According to an embodiment, the method includes: receiving, by the first device, a plurality of timestamps including a first timestamp and a second timestamp, and determining, by the first device, a range R with respect to the second device by calculating an average time-of-flight (TOF) of the first wireless signal and the second wireless signal based on the first timestamp and the second timestamp. The first timestamp indicates a time-of-arrival (TOA) of a first wireless signal arriving at the second device, a maximum possible value of the first timestamp being $T_{max1}$. The second timestamp indicates a time-of-departure (TOD) of a second wireless signal departing from the second device, and a maximum possible value of the second timestamp being $T_{max2}$ and greater than $T_{max1}$.

6 Claims, 6 Drawing Sheets receiving, by the first device, a plurality of timestamps including a first timestamp and a second timestamp
501 determining, by the first device, a range R with respect to the second device based on the first timestamp and the second timestamp
502

Related U.S. Application Data filed on Oct. 1, 2020, provisional application No. 63/084,447, filed on Sep. 28, 2020, provisional application No. 63/081,162, filed on Sep. 21, 2020.

(51) Int. Cl.
*H04B 17/27* (2015.01)
*H04L 43/106* (2022.01)

(58) Field of Classification Search
CPC .. G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04L 43/106; H04B 17/27
See application file for complete search history.

(56) References Cited

U.S. PATENT DOCUMENTS

| | | | |
|---|---|---|---|
| 2013/0336131 A1* | 12/2013 | Zhang | G01S 13/765 370/252 |
| 2014/0154996 A1* | 6/2014 | Banin | H04W 56/00 455/67.11 |
| 2015/0102957 A1 | 4/2015 | Mastio et al. | |
| 2015/0105027 A1 | 4/2015 | Mastio et al. | |
| 2015/0382143 A1* | 12/2015 | Lindskog | H04W 4/023 455/456.1 |
| 2016/0088497 A1* | 3/2016 | Segev | H04W 24/02 370/252 |
| 2017/0013412 A1* | 1/2017 | Steiner | H04W 64/00 |
| 2017/0064505 A1* | 3/2017 | Eyal | H04W 12/069 |
| 2017/0064575 A1* | 3/2017 | Eyal | H04L 67/52 |
| 2017/0127412 A1* | 5/2017 | Amizur | H04W 64/00 |
| 2017/0188191 A1* | 6/2017 | Aldana | H04W 4/023 |
| 2018/0091949 A1* | 3/2018 | Steiner | G01S 13/825 |
| 2018/0180710 A1* | 6/2018 | Handte | G01S 5/10 |
| 2018/0227874 A1* | 8/2018 | Sirotkin | G01S 5/00 |
| 2019/0305813 A1* | 10/2019 | Zhang | G01S 7/42 |
| 2019/0391252 A1* | 12/2019 | Waheed | G01S 13/765 |
| 2020/0015038 A1 | 1/2020 | Burugupalli et al. | |
| 2020/0137518 A1 | 4/2020 | Burugupalli et al. | |
| 2022/0215760 A1* | 7/2022 | Jorgensen | G08G 5/0026 |

FOREIGN PATENT DOCUMENTS

| | | | |
|---|---|---|---|
| WO | WO-2018048473 A1 * | 3/2018 | |
| WO | WO-2018048775 A2 * | 3/2018 | .......... G01S 13/825 |
| WO | WO-2018102247 A2 * | 6/2018 | ............. G01S 11/00 |
| WO | WO-2019190519 A1 * | 10/2019 | |
| WO | WO-2020240177 A1 * | 12/2020 | ............. G06N 20/20 |

\* cited by examiner

SYSTEM AND METHOD OF OPTIMIZING WIRELESS DEVICE RANGING

PRIORITY

This application claims the priority benefit under 35 U.S.C. § 119(e) of U.S. Provisional Patent Application No. 63/081,162, filed on Sep. 21, 2020, U.S. Provisional Application No. 63/084,447, filed on Sep. 28, 2020, U.S. Provisional Patent Application No. 63/086,527, filed on Oct. 1, 2020, and U.S. Provisional Patent Application 63/091,873, filed on Oct. 14, 2020, all of which are incorporated herein by reference in their entirety.

FIELD

The present disclosure generally relates to wireless communication systems. In particular, the present disclosure is related to a system and method of optimizing wireless device ranging.

BACKGROUND

Ranging generally refers to a process of establishing a target distance. As an example, two wireless communications systems or devices may perform ranging to determine the distance between them by exchanging ranging information via radio frequency (RF) signals, determining a time-of-flight (ToF) of the RF signals based on the ranging information, and calculating the distance by multiplying the ToF by the speed of light. In the case of passive ranging, a third wireless device may listen in on the information exchange to determine a differential distance from the two wireless devices.

The ranging information exchanged may include a sizeable number of null data packets (NDPs) that are exchanged during a sounding phase and a correspondingly sizeable number of measurements (such as the time-of-arrival (TOA) and time-of-departure (TOD) timestamps of the NDPs) that are exchanged during a reporting phase. One or more of the wireless devices may process the ranging information to determine a target distance. Thus, there is generally a significant amount of signaling overhead and complex calculations involved in the ranging process.

Mobile devices that have ranging capabilities are more spatially aware and, through that spatial awareness, are able to offer a growing number of exciting features to users. As such, there are efforts to optimize and standardize ranging protocols, such as the Fine Time Measurement (FTM) protocol in the Institute of Electrical and Electronics Engineers (IEEE) 802.11 az standard.

SUMMARY

A method of performing ranging, by a first device, with respect to a second device is provided. According to an embodiment, the method includes: receiving, by the first device, a plurality of timestamps including a first timestamp and a second timestamp, and determining, by the first device, a range R with respect to the second device by calculating an average time-of-flight (TOF) of the first wireless signal and the second wireless signal based on the first timestamp and the second timestamp. The first timestamp indicates a time-of-arrival (TOA) of a first wireless signal arriving at the second device, a maximum possible value of the first timestamp being $T_{max1}$. The second timestamp indicates a time-of-departure (TOD) of a second wireless signal departing from the second device, and a maximum possible value of the second timestamp being $T_{max2}$ and greater than $T_{max1}$.

A first device that performs ranging with respect to a second device is provided. According to an embodiment, the first device includes: an antenna that receives wireless signals including a plurality of timestamps including a first timestamp and a second timestamp, and a ranging processor that determines a range R with respect to the second device by calculating an average time-of-flight (TOF) of the first wireless signal and the second wireless signal based on the first timestamp and the second timestamp. The first timestamp indicates a time-of-arrival (TOA) of a first wireless signal arriving at the second device, a maximum possible value of the first timestamp being $T_{max1}$, and the second timestamp indicates a time-of-departure (TOD) of a second wireless signal departing from the second device, a maximum possible value of the second timestamp being $T_{max2}$ and greater than $T_{max1}$.

BRIEF DESCRIPTION OF THE DRAWINGS

The above and other aspects and features of certain embodiments of the present disclosure will be more apparent from the following detailed description, taken in conjunction with the accompanying drawings, in which.

DETAILED DESCRIPTION

Figure 1:
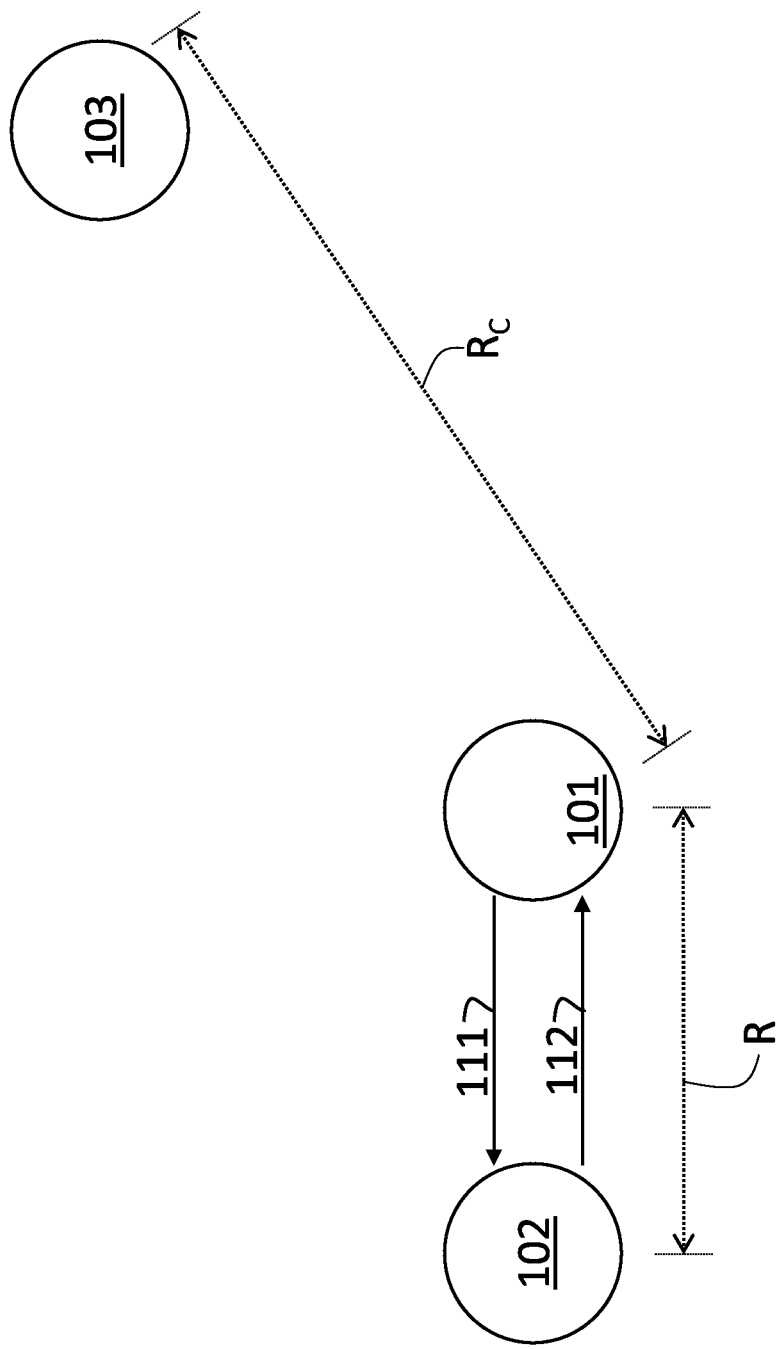
FIG. 1 illustrates a diagram of wireless devices participating in a ranging process, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions may be omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc., may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof; the terms "include" or "have" do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one or more embodiments of the present disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively," as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may be used interchangeably with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

During Wi-Fi FTM measurements, measurement packets are transmitted and received by wireless stations (STAs). In IEEE 802.11az, these measurement packets are NDPs (and in 802.11REVmc, these are FTM frames). The STAs that participate in these measurements each timestamp the TOD (when applicable) and the TOA for when they transmit or receive these measurement packets. Due to physical limitations, the propagation times for the measurement packets, as they go from one STA to another, are bounded such that an assumption of a possible maximum propagation time can often be made.

It may be assumed that a range calculating STA, or the STA that is calculating its range to another STA, generally has an exact, ambiguity-free notion of its own TOD and/or TOA timestamps. The range calculating also receives reported timestamps from the other involved STAs; however, these reported timestamps are associated with an ambiguity due to the limit on the maximum value they can represent before they wrap back to zero.

Each TOD or TOA event, for which a timestamp is reported to the range calculating STA, has a corresponding TOA or TOD event in the range calculating STA itself, which it knows the exact time for. When the propagation times are assumed to be small in comparison to the timestamp ambiguity and thus can be ignored, the range calculating STA is able to form an approximate but ambiguity-free estimate of the corresponding reported TOD or TOA event. Furthermore, by combining this ambiguity-free estimate of the reported TOD or TOA and the exact, but ambiguous, reported timestamp, the range calculating STA can form an exact, ambiguity-free timestamp for the reported TOD or TOA event.

Stated more succinctly, exact, ambiguity-free local TOD/TOA timestamps in the range calculating STA may be used to form approximate, ambiguity-free timestamps for corresponding, close-in-time, reported TOD/TOA events, and these approximate, ambiguity-timestamps may be combined with exact, but ambiguous, reported timestamps to form exact, ambiguity-free timestamps for the reported TOD/TOA events. This system and method of resolving ambiguities due to reported timestamps are described in further detail below by way of example embodiments and illustrations.

FIG. 1 illustrates a diagram of wireless devices participating in a ranging process, according to an embodiment. The ranging process of FIG. 1 may be a fine ranging process such as the Wi-Fi FTM Round Trip Time (RTM) ranging process for indoor positioning. A first device 101, which may be referred to as an initiator station (ISTA), initiates ranging with a second device 102, which may be referred to as a responder station (RSTA). As part of the ranging, the first device 101 sends one or more wireless signals 111 to the second device 102, and the second device 102 responds with one or more wireless signals 112. In some embodiments, the wireless signals 111 and 112 may include NDPs that do not carry substantive information during a sounding phase of the ranging process and may include TOA and TOD timestamps of the NDPs during a reporting phase of the ranging process. Based on the TOA and TOD timestamps that are reported, the first device 101 or the second device 102 may calculate an estimated range R between them.

FIG. 1 further illustrates a third device 103 that is estimated to be a coarse range $R_C$ from the first device 101. The coarse range $R_C$ denotes a rough range estimate that is generally less precise than the estimated range R described above for the fine ranging process being performed between the first device 101 and the second device 102. In some embodiments, the coarse range $R_C$ may be calculated by the first device 101 based on a known location of the third device 103 and an approximate location estimate of the first device 101. For example, the third device 103 may be a stationary device whose fixed location is known to the first device 101, and the first device 101 may include a positioning device (e.g., a device with global positioning system (GPS)/global navigation satellites system (GNSS) capabilities) that enables the first device 101 to determine or approximate its own location. In some embodiments, the coarse range $R_C$ may be estimated based on a signal strength of a signal received from the third device 103. If the first device 101 determines based on the coarse range $R_C$ that the third device 103 is too far away to resolve ambiguities that may be encountered in the fine ranging process, the first device 101 may refrain from performing fine ranging with the third device 103.

Ambiguities may arise during performance of the fine ranging process because the reported timestamp may have wrapped around one or more times. For example, a timestamp is generally tracked by a counter, and when the counter reaches its maximum possible value $C_{max}$ (e.g., $2^N-1$ for an N-bit counter), the counter wraps around to 0. Thus, even though the reported timestamp is $t_{reported}$, the elapsed time may actually be $k \times T_{stamp\_max} + t_{reported}$, where k is an integer denoting an ambiguity count, and $T_{stamp\_max}$ is the maximum timestamp value that corresponds to the maximum counter value $C_{max}$. A method of resolving ambiguities resulting from possible wrapping of the timestamps for RTM ranging is discussed below with reference to FIG. 2.

Figure 2:
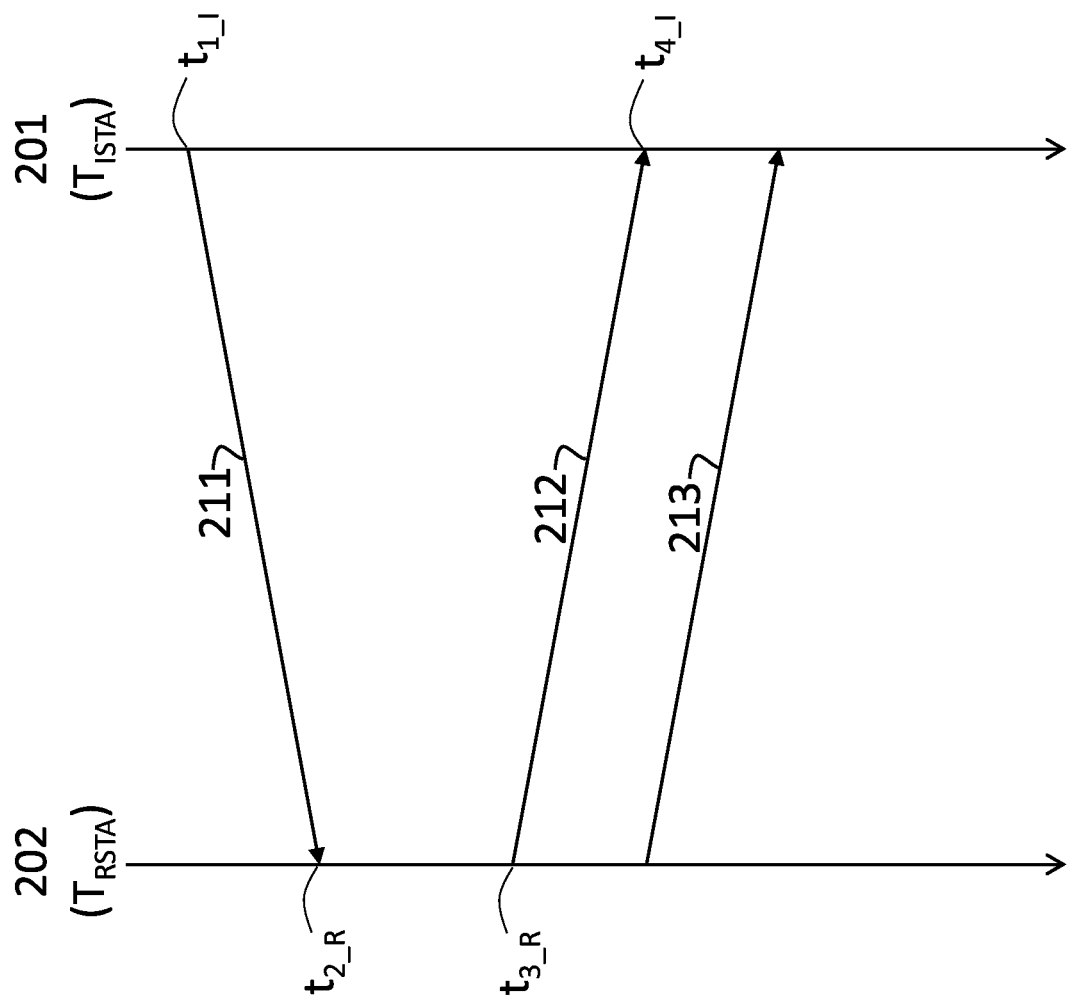
FIG. 2 illustrates an exchange of ranging information between an ISTA and an RSTA along their respective clock domains, according to an embodiment.

FIG. 2 illustrates an exchange of ranging information between an ISTA and an RSTA along their respective clock domains, according to an embodiment. The ISTA and RSTA may correspond to the first device 101 and the second device 102, respectively. The ISTA sends an NDP 211 to the ISTA at TOD $t_{1\_I}$, and the RSTA receives the NDP 211 at TOA $t_{2\_R}$. In response to receiving the NDP 211, the RSTA sends an NDP 212 to the ISTA at TOA $t_{3\_R}$, and the ISTA receives the NDP 212 at TOA $t_{4\_I}$. Since TOD $t_{1\_I}$ and TOA $t_{4\_I}$ are recorded by the ISTA, they correspond to values in the ISTA's clock domain 201 ($T_{ISTA}$). Similarly, since the TOA $t_{2\_R}$ and the TOD $t_{3\_R}$ are recorded by the RSTA, they correspond to values in the RSTA's clock domain 202 ($T_{RSTA}$). The RSTA also sends to the ISTA a measurement report 213 that includes reported timestamps $t_{2\_r}$ and $t_{3\_r}$ corresponding to TOA $t_{2\_R}$ and the TOD $t_{3\_R}$, respectively. TOA $t_{2\_R}$ and the TOD $t_{3\_R}$ may be expressed as:

$$t_{2\_R} = k2 \times T_{stamp\_max} + t_{2\_r} \quad (1)$$

$$t_{3\_R} = k3 \times T_{stamp\_max} + t_{3\_r} \quad (2)$$

where k2 and k3 are integers and denote ambiguity counts for reported timestamps $t_{2\_r}$ and $t_{3\_r}$, respectively, and $T_{stamp\_max}$ is the maximum value for the representation of the timestamp before it wraps back to zero. For this example, $T_{stamp\_max}$ is assumed to be the same for each of the reported timestamps $t_{2\_r}$ and $t_{3\_r}$, though in other examples discussed later, the $T_{stamp\_max}$ for TOA timestamps may have a different value than that of the $T_{stamp\_max}$ for TOD timestamps.

To calculate its range R from the RSTA, the ISTA converts the TOA $t_{2\_R}$ and TOD $t_{3\_R}$ in the RSTA's clock domain to corresponding values $t_{2\_I}$ and $t_{3\_I}$ in the ISTA's clock domain:

$$t_{2\_I} = (1+a)t_{2\_R} + b \quad (3)$$

$$t_{3\_I} = (1+a)t_{3\_R} + b \quad (4)$$

where a is the differential rate of the ISTA's clock as compared to the RSTA's clock, and b is an offset. Applying expressions (1) through (4), the roundtrip time (RTT), which is the propagation time from the ISTA to the RSTA and then back from the RSTA to the ISTA, can be calculated:

$$RTT = t_{4\_I} - t_{1\_I} - (t_{3\_I} - t_{2\_I}) \quad (5a)$$

$$RTT = t_{4\_I} - t_{1\_I} - ((1+a)t_{3\_R} + b - (1+a)t_{2\_R} - b) \quad (5b)$$

$$RTT = t_{4\_I} - t_{1\_I} - (1+a)(t_{3\_R} - t_{2\_R}) \quad (5c)$$

$$RTT = t_{4\_I} - t_{1\_I} - (1+a)(k3 \times T_{stamp\_max} + t_{3\_r} - k2 \times T_{stamp\_max} - t_{2\_r}) \quad (5d)$$

$$RTT = t_{4\_I} - t_{1\_I} - (1+a)(t_{3\_r} - t_{2\_r}) - (1+a)(k3 - k2) T_{stamp\_max} \quad (5e)$$

The range R may be calculated by multiplying the average ToF (i.e., RTT/2) of the wireless signals carrying the NDPs by the speed of light c and dividing by 2.

$$R = c \times RTT/2 \quad (6a)$$

$$R = c(t_{4\_I} - t_{1\_I} - (1+a)(t_{3\_r} - t_{2\_r}))/2 + (k2 - k3)R_{amb} \quad (6b)$$

where $R_{amb} = c(1+a)T_{stamp\_max}/2$. The resulting ambiguity for the range R is therefore an integer multiple (i.e., k2−k3) of unit ambiguity $R_{amb}$.

While the values k2 and k3 are generally unknown, the difference $k_{diff} = k2 - k3$ may be uniquely determined if the unit ambiguity $R_{amb}$ is large compared to the assumed or estimated possible range between the ISTA and the RSTA. That is, in such case, there would be one integer value for $k_{diff}$ such that the resulting range R falls within a reasonably correct range for the true distance.

If a range calculating STA knows the location of another STA and also has an approximate knowledge of its own location, such as up to an error $R_{max\_loc\_err}$, the range calculating STA may determine a coarse range estimate $R_C$ from the other STA. This may be the case when the range calculating STA ranges with the other STA with the purpose of determining its own absolute position. Based on the coarse range estimate $R_C$, the range calculating STA may refrain from ranging with STAs that are too far away for the resulting range ambiguity to be uniquely resolved. For example, STAs that are more than $R_{amb} - R_{max\_loc\_err}$ away from the range calculating STA (e.g., $R_C > R_{amb} - R_{max\_loc\_err}$) may be excluded from the ranging calculations.

Once the range calculating STA has determined that an STA should be included in the ranging calculations, it may resolve the resulting range ambiguity to that STA by determining the integer k (e.g., positive, 0 or negative) such that when adding $k \times R_{amb}$ to a calculated range $R_{calc}$, the range R falls in the interval $[-R_{err}, R_{amb} - R_{err}]$, where $R_{err}$ is a maximum measurement error associated with the ranging procedure. In some embodiments, the first addend of expression (6b) may be used as the calculated range $R_{calc}$:

$$R_{calc}=C(t_{4\_r}-t_{1\_r}-(1+a)(t_{3\_r}-t_{2\_r}))/2 \qquad (7)$$

In some embodiments, the coarse range estimate $R_C$ may be used as the calculated range $R_{calc}$:

$$R_{calc}=R_C \qquad (8)$$

If a range calculating STA does not know the location of the other STA that it is considering ranging with, the range calculating STA may use a signal strength of signals received from the other STA to gauge how far the other STA is as a coarse range estimate. For example, the range calculating STA may exclude STAs whose signal is below a signal strength threshold. By ranging only with STAs whose signal is above the signal strength threshold, the range calculating STA would be able to uniquely resolve the range calculation by determining the integer k (e.g., positive, 0 or negative) such that when adding k×$R_{amb}$ to a calculated range $R_{calc}$, the range R falls in the interval [-$R_{err}$, $R_{amb}$-$R_{err}$].

Figure 3:
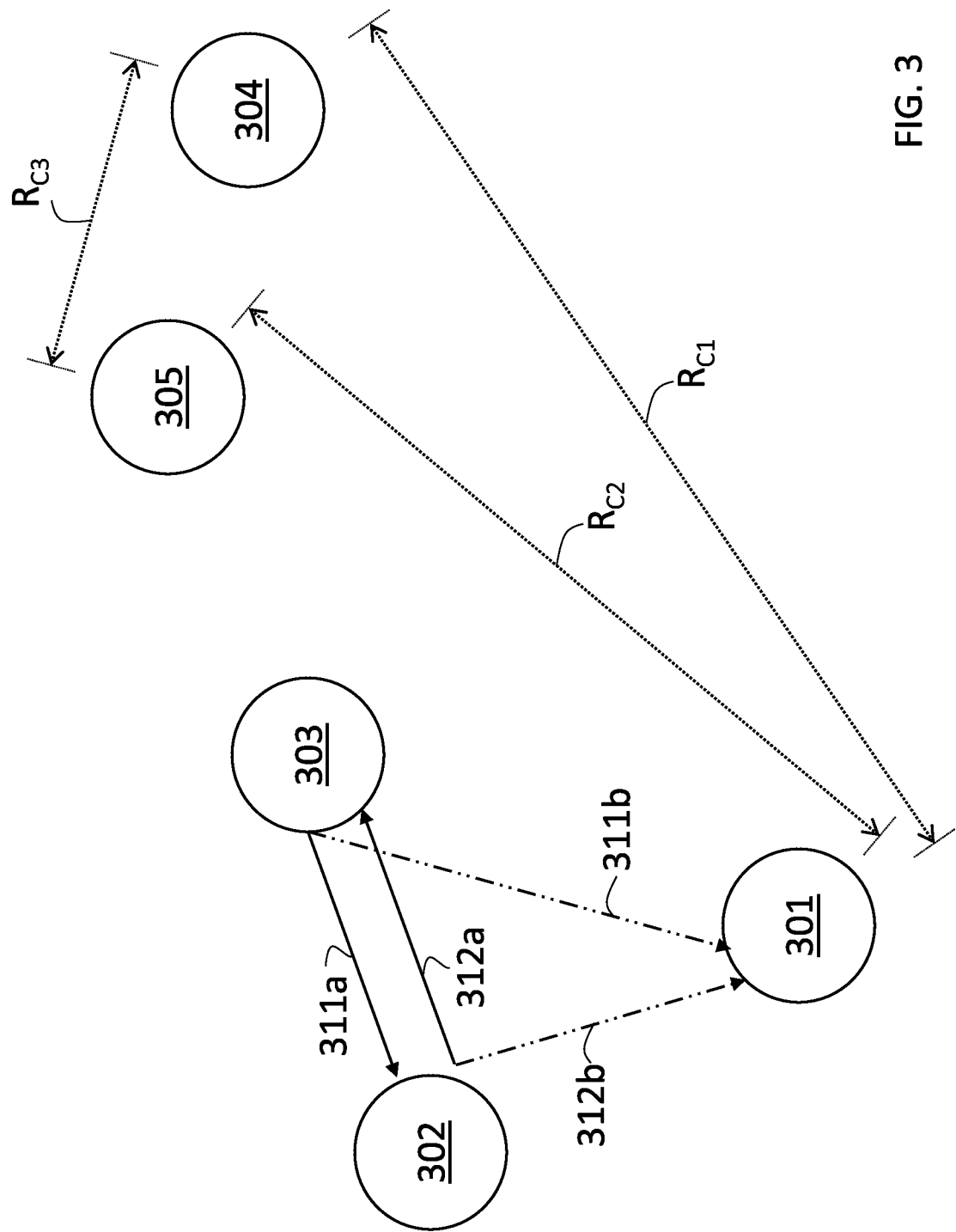
FIG. 3 illustrates a diagram of wireless devices participating in another ranging process, according to an embodiment.

FIG. 3 illustrates a diagram of wireless devices participating in another ranging process, according to an embodiment. A first device 301, which may be referred to as a passive station (PSTA), performs passive ranging by listening to an exchange of ranging information between a second device 302 and a third device 303, which may correspond to an RSTA-ISTA pair. The third device 303 sends one or more wireless signals 311, which are received by the second device 302 as signals 311a and by the first device 301 as signals 311b. Similarly, the second device 302 responds with one or more wireless signals 312, which are received by the third device 303 as signals 312a and by the first device 301 as signals 312b.

In some embodiments, the wireless signals 311 and 312 may include NDPs that do not carry substantive information during a sounding phase of the ranging process and may include TOA and TOD timestamps of the NDPs during a reporting phase of the ranging process. Based on the TOA and TOD timestamps that are reported, the first device 301 may calculate a differential range $R_{diff}$, which is a difference between a distance from the first device 301 to the second device 302 and a distance from the first device 301 to the third device 303.

FIG. 3 further illustrates a fourth device 304 that is estimated to be a coarse range $R_{C1}$ from the first device 301 and a fifth device 305 that is estimated to be a coarse range $R_{C2}$ from the first device 301. The fourth device 304 and the fifth device 305 are an estimated coarse range $R_{C3}$ from each other. The coarse ranges $R_{C1}$, $R_{C2}$ and $R_{C3}$ denote rough range values that may be estimated, for example, by the first device 301 using methods similar to those described above for determining the coarse range $R_C$ shown in FIG. 1. If the first device 301 determines that coarse $R_{C1}$ is greater than a maximum range $R_{max}$, which may be a predetermined value, the first device 301 may refrain from using the fourth device 304 for passive ranging. Similarly, if the first device 301 determines that coarse $R_{C2}$ is greater than the maximum range $R_{max}$, the first device 301 may refrain from using the fifth device 305 for passive ranging. If the first device 301 determines that coarse $R_{C3}$ is greater than a maximum range $R_{max}$, the first device 301 may refrain from using the fourth device 304 and the fifth device 305 as a pair for passive ranging. The maximum range $R_{max}$ may be a predetermined value and may be calculated based on a unit ambiguity value $R_{amb}$, as described further below.

Figure 4:
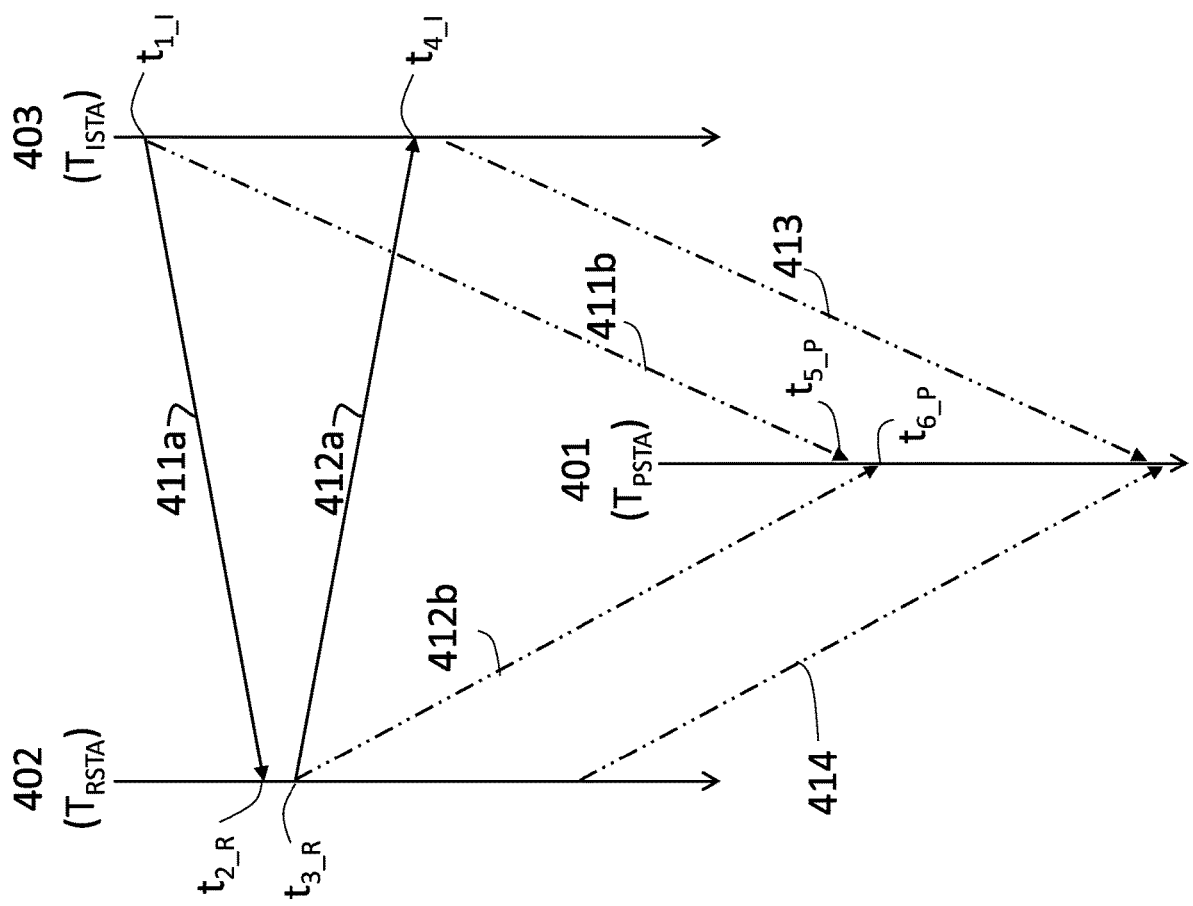
FIG. 4 illustrates a PSTA listening in on an exchange of ranging information between an ISTA and an RSTA along their respective clock domains, according to an embodiment.

FIG. 4 illustrates a PSTA listening in on an exchange of ranging information between an ISTA and an RSTA along their respective clock domains, according to an embodiment. The PSTA, RSTA and ISTA may correspond to the first device 301, the second device 302, and the third device 303, respectively. During a sounding phase, the ISTA sends an NDP 411 at TOD $t_{1\_I}$, and the NDP 411 is received by the RSTA at TOA $t_{2\_R}$ as NDP 411a and received by the PSTA at TOA $t_{5\_P}$ as NDP 411b. In response to receiving the NDP 411a, the RSTA sends an NDP 412 at TOD $t_{3\_R}$, and the NDP 412 is received by the ISTA at TOA $t_{4\_I}$ as NDP 412a and received by the PSTA at TOA $t_{6\_P}$ as NDP 412b. Since TOD $t_{1\_I}$ and TOA $t_{4\_I}$ are recorded by the ISTA, they correspond to values in the ISTA's clock domain 403 ($T_{ISTA}$); similarly, the TOA $t_{2\_R}$ and the TOD $t_{3\_R}$ correspond to values in the RSTA's clock domain 402 ($T_{RSTA}$), and the TOA $t_{5\_P}$ and the TOD $t_{6\_P}$ correspond to values in the PSTA's clock domain 401 ($T_{PSTA}$). During a reporting phase, the ISTA sends a measurement report 413 that includes reported timestamps $t_{1\_i}$ and $t_{4\_i}$ corresponding to TOD $t_{1\_I}$ and the TOA $t_{4\_I}$, respectively. Also, the RSTA sends a measurement report 414 that includes reported timestamps $t_{2\_r}$ and $t_{3\_r}$ corresponding to TOA $t_{2\_R}$ and the TOD $t_{3\_R}$, respectively. The measurement reports 413 and 414 are received by the PSTA, which may use the reported timestamps along with its recorded timestamps to calculate a differential range from the ISTA and RSTA. This type of ranging is referred to as a passive ranging since the PSTA does not necessarily need to communicate with the ISTA and/or RSTA; it only needs to listen to the exchange of ranging information between them.

In some embodiments different from what is shown in FIG. 4, the timestamps $t_{1\_i}$, $t_{4\_i}$, $t_{2\_r}$ and $t_{3\_r}$ may be received together by the PSTA in a single measurement report. For example, the ISTA may send a measurement report to the RSTA including the timestamps $t_{1\_i}$ and $t_{4\_i}$, and the RSTA may subsequently send a measurement report to the PSTA including all four timestamps $t_{1\_i}$, $t_{4\_i}$, $t_{2\_r}$ and $t_{3\_r}$. Or vice versa, the RSTA may send a measurement report to the ISTA including the timestamps $t_{2\_r}$ and $t_{3\_r}$, and the ISTA may subsequently send a measurement report to the PSTA including all four timestamps $t_{1\_i}$, $t_{4\_i}$, $t_{2\_r}$ and $t_{3\_r}$.

Since each of the reported timestamps may have wrapped one or more times, TOD $t_{1\_I}$, TOA $t_{4\_I}$, TOA $t_{2\_R}$ and the TOD $t_{3\_R}$ may be expressed as:

$$t_{1\_I}=k1 \times T_{stamp\_max}+t_{1\_i} \qquad (9)$$

$$t_{4\_I}=k4 \times T_{stamp\_max}+t_{4\_i} \qquad (10)$$

$$t_{2\_R}=k2 \times T_{stamp\_max}+t_{2\_r} \qquad (11)$$

$$t_{3\_R}=k3 \times T_{stamp\_max}+t_{3\_r} \qquad (12)$$

where k1, k4, k2 and k3 are integers and denote ambiguity counts for reported timestamps $t_{1\_i}$, $t_{4\_i}$, $t_{2\_r}$ and $t_{3\_r}$, respectively, and $T_{stamp\_max}$ is the maximum value for the representation of the timestamp before it wraps back to zero. For this example, $T_{stamp\_max}$ is assumed to be the same for each of the reported timestamps $t_{1\_i}$, $t_{4\_i}$, $t_{2\_r}$ and $t_{3\_r}$ (e.g., each of the reported timestamps are represented by the same bit-count).

To use the reported timestamps in its clock domain, the PSTA converts the TOD $t_{1\_I}$ and TOA $t_{4\_I}$ values in the ISTA's clock domain and the TOA $t_{2\_R}$ and TOD $t_{3\_R}$ values in the RSTA's clock domain to corresponding values $t_{1\_P}$, $t_{4\_P}$, $t_{2\_P}$ and $t_{3\_P}$ in the PSTA's clock domain:

$$t_{1\_P}=(1+a_I)t_{1\_I}+b_I \quad (13)$$

$$t_{4\_P}=(1\pm a_I)t_{1\_I}+b_I \quad (14)$$

$$t_{2\_P}=(1+a_R)t_{2\_R}+b_R \quad (15)$$

$$t_{3\_P}=(1+a_R)t_{3\_R}+b_R \quad (16)$$

where $a_I$ is the differential rate of the PSTA's clock as compared to the ISTA's clock, $a_R$ is the differential rate of the PSTA's clock as compared to the RSTA's clock, and $b_I$ and $b_R$ are offsets. Applying expressions (9) through (16), a differential time-of-flight (DToF), which is a difference between the propagation time from the ISTA to the PSTA and the propagation time from the RSTA to the PSTA, can be calculated:

$$DToF=t_{6\_P}-t_{5\_P}-[(t_{3\_P}-t_{2\_P})+((t_{4\_P}-t_{1\_O})-((t_{3\_P}-t_{2\_P}))/2) \quad (17a)$$

$$DToF=t_{6\_P}-t_{5\_P}-[(t_{3\_P}-t_{2\_P})/2+(t_{4\_P}-t_{1\_P})/2) \quad (17b)$$

$$DToF=t_{6\_P}-t_{5\_P}-0.5t_{3\_P}+0.5t_{2\_P}-0.5t_{4\_P}+0.5t_{1\_P} \quad (17c)$$

$$DToF=t_{6\_P}-t_{5\_P}+0.5(1+a_R)(t_{2\_R}-t_{3\_R})+0.5(1+a_I)(t_{1\_I}-t_{4\_I}) \quad (17d)$$

$$DToF=t_{6\_P}-t_{5\_P}+0.5(1+a_R)(t_{2\_r}-t_{3\_r})+0.5(1+a_I)(t_{1\_i}-t_{4\_i})+0.5(1+a_R)(k2-k3)T_{stamp\_max}+0.5(1+a_I)(k1-k4)T_{stamp\_max} \quad (17e)$$

Because $a_R$ and $a_I$ are generally not equal, the range ambiguity is not a single term, unlike the RTT ranging case discussed above. Instead, a separate unit ambiguity term may be defined for timestamps $t_{2\_r}$ and $t_{3\_r}$ reported by the RSTA and for timestamps $t_{1\_i}$ and $t_{4\_i}$ reported by the ISTA:

$$R_{amb\_R}=c(1\pm a_R)T_{stamp\_max}/2 \quad (18)$$

$$R_{amb\_I}=c(1+a_I)T_{stamp\_max}/2 \quad (19)$$

To resolve the resulting range ambiguity $R_{tot\_amb}=(k2-k3)R_{amb\_R}+(k1-k4)R_{amb\_R}$, approximations may be made, for example, by ignoring the propagation delays or assuming they are small compared to the propagation times corresponding to the range ambiguities $R_{amb\_R}$ and $R_{amb\_I}$, i.e. $R_{amb\_R}/c$ and $R_{amb\_I}/C$. When ignoring the propagation delays, these times are approximately equal:

$$t_{1\_P}\approx t_{2\_P}\approx t_{5\_P} \quad (20)$$

$$t_{3\_P}\approx t_{4\_P}\approx t_{6\_P} \quad (21)$$

For estimating (k2-k3), consider the specific approximate equalities:

$$t_{2\_P}\approx t_{5\_P} \quad (22a)$$

$$t_{3\_P}\approx t_{6\_P} \quad (23a)$$

Substituting $t_{2\_P}$ and $t_{3\_P}$ with their representation in $t_{2\_R}$ and $t_{3\_R}$ results in:

$$(1+a_R)t_{2\_R}+b_R\approx t_{5\_P} \quad (22b)$$

$$(1+a_R)t_{3\_R}+b_R\approx t_{6\_P} \quad (23b)$$

Substituting $t_{2\_R}$ and $t_{3\_R}$ times with the expressions for them in their reported values results in:

$$(1+a_R)(t_{2\_r}+k2\times T_{stamp\_max})+b_R\approx t_{5\_P} \quad (22c)$$

$$(1+a_R)(t_{3\_r}+k3\times T_{stamp\_max})+b_R\approx t_{6\_P} \quad (23c)$$

Subtracting (23c) from (22c) gives:

$$(1+a_R)(t_{2\_r}-t_{3\_r})+(1+a_R)T_{stamp\_max}(k2-k3)\approx t_{5\_P}-t_{6\_P} \quad (24a)$$

Solving for (k2-k3) gives:

$$k_{R\_est}=k2-k3\approx[t_{5\_P}-t_{6\_P}-(1+a_R)(t_{2\_r}-t_{3\_r})]/((1+a_R)T_{stamp\_max}) \quad (24b)$$

Thus, the possible values of $k_{R\_est}$ may be limited and estimated.

For estimating (k1-k4), consider the specific approximate equalities:

$$t_{1\_P}\approx t_{5\_P} \quad (25a)$$

$$t_{4\_P}\approx t_{6\_P} \quad (26a)$$

Substituting $t_{1\_P}$ and $t_{1\_P}$ with their representation in $t_{1\_I}$ and $t_{4\_I}$ results in:

$$(1+a_I)t_{1\_I}+b_I\approx t_{5\_P} \quad (25b)$$

$$(1+a_I)t_{4\_I}+b_I\approx t_{6\_P} \quad (26b)$$

Substituting $t_{1\_I}$ and $t_{4\_I}$ times with the expressions for them in their reported values results in:

$$(1+a_I)(t_{1\_i}+k1\times T_{stamp\_max})+b_I\approx t_{5\_P} \quad (25c)$$

$$(1+a_I)(t_{4\_i}+k4\times T_{stamp\_max})+b_I\approx t_{6\_P} \quad (26c)$$

Subtracting (26c) from (25c) gives:

$$(1+a_R)(t_{2\_r}-t_{3\_r})+(1+a_R)T_{stamp\_max}(k2-k3)\approx t_{5\_P}-t_{6\_P} \quad (27a)$$

Solving for (k2-k3) gives:

$$k_{I\_est}=k1-k4\approx[t_{5\_P}-t_{6\_P}-(1+a_I)(t_{1\_i}-t_{4\_i})]/((1+a_I)T_{stamp\_max}) \quad (27b)$$

Thus, the possible values of $k_{I\_est}$ may be limited and estimated.

Note that $a_R$ is the differential clock rate offset of the PSTA in relation to the RSTA, and $a_I$ is the differential clock rate offset of the PSTA in relation to the ISTA. The PSTA may be able to estimate the differential clock rate offsets $a_R$ and $a_I$, for example, by observing the corresponding carrier frequency offsets as the carrier and timestamp clocks are tied.

Equations (24b) and (27b) demonstrate using the difference of the timestamps at the PSTA, combined with the reported timestamps, to estimate how many times the reported timestamps from the ISTA and RSTA, respectively, have wrapped from their first reported timestamp to their last. In particular, for the $t_{1\_i}$ to the $t_{4\_i}$ timestamps from the ISTA, there are k1-k4 wrappings, and for the $t_{2\_r}$ to the $t_{3\_r}$ timestamps from the RSTA, there are k3-k2 wrappings.

Although the values for k2-k3 and k1-k4 in equation (17e) are expected to be integers, when calculating estimates $k_{R\_est}$=k2-k3 and $k_{I\_est}$=k1-k4 using equations (24b) and (27b), the values for $k_{R\_est}$ and $k_{I\_est}$ would generally not result in integers due to the approximations taken and would need to be rounded up or down. One way to calculate estimates ("k2mk3_int_est" and "k1mk4_int_est") of the true values of k2-k3 and k1-k4 from $k_{R\_est}$ and $k_{I\_est}$ is set forth in the example Matlab code below, where "k2mk3_raw_est" represents $k_{R\_est}$ and "k1mk4_raw_est" represents $k_{I\_est}$:

Line 1: k2mk3_int_est=round(k2mk3_raw_est);
Line 2: k2mk3_rounding_error=k2mk3_int_est−k2mk3_raw_est;
Line 3: k1mk4_int_est=round(k1mk4_raw_est);
Line 4: k1mk4_rounding_error=k1mk4_int_est−k1mk4_raw_est;
Line 5: if (k2mk3_rounding_error−k1mk4_rounding_error) <0
Line 6: if abs(k2mk3_rounding_error)>abs(k1mk4_rounding_error)
Line 7: k2mk3_i_nt est=k2mk3_int_est+1;
Line 8: else
Line 9: k1mk4_int_est=k1mk4_int_est−1;
Line 10: end
Line 11: end The conditional correction of the rounded raw estimates done in lines 5-11 is a correction that takes care of some of the corner cases in the estimation procedure. Once computed, values for k2−k3 and k1−k4 may be replaced with the estimates k2mk3_int_est and k1mk4_int_est, respectively, in equation (17e) to compute DToF.

Other considerations and methods may be used to resolve the problem of finding correct estimates for k2−k3 and k1−k4. Examples of such considerations and methods may include:

Excluding estimates of k2−k3 and k1−k4 that give unreasonable DToF, e.g. values that are not possible given the assumed distances between the STAs.

Consider a range of integer values around $k_{R\_est}$ and $k_{I\_est}$ and, from these options, select the value for k2−k3 and k1−k4 that, together with other range or differential range measurements, gives the most likely or consistent measurement.

When assuming $T_{stamp\_max}$ is large compared to the assumed maximum propagation times in the measurements and the differences in clock rates between the RSTA or ISTA and the PSTA are small, the ambiguities can be resolved, and the true differential range $R_{diff}=c \times DToF$ can be uniquely determined by using equations (17a) through (27b), in combination with reasonable assumptions of the maximum differential range from the PSTA to the RSTA/ISTA pair. The arguments made above may hold equally if the PSTA, as is allowed in passive trigger-based (TB) ranging, does differential ranging to a pair of ISTAs.

In the above calculations, it was assumed that the propagation delays in the ranging exchanges can be ignored or that they are small in comparison to the propagation times corresponding to the range ambiguities $R_{amb\_R}$ and $R_{amb\_I}$, i.e. small compared to $R_{amb\_R}/c$ and $R_{amb\_I}/c$. These assumptions can be made when there is knowledge of the distances between the STAs involved in these ranging exchanges, which is generally reasonable for differential ranging use cases. Differential range measurements are generally used for navigation purposes, e.g., for enabling a device, the range calculating STA, to measure its position. To do this, the range calculating STA would generally need to know the location of the two STAs it is ranging to. It is also generally reasonable to assume that the range calculating STA has an approximate idea of its own location from extraneous information, for example, from a recent GPS/GNSS location. The range calculating STA may have an approximate knowledge of its own position, such as up to an absolute value error of $R_{max\_loc\_err}$. If these assumptions hold true, the range calculating STA would generally be in a position to estimate the ranges and the propagation times among all three STAs involved in the ranging calculations.

Pairs of STAs that would potentially cause propagation delays that are too large, resulting in a situation in which the range ambiguities cannot be uniquely resolved, may be excluded from the differential range measurements. For example, the range calculating STA may exclude a pair of STAs to do differential ranging with if an estimated distance between two STAs, among the pair of STAs and the range calculating STA, exceeds $R_{amb\_R}-R_{max\_loc\_err}$ or $R_{amb\_I}-R_{max\_loc\_err}$. Once the ranging calculating STA excludes pairs of STAs that create propagation distances that are too long to allow for unique determination of the range ambiguities, the range calculating STA can generally resolve the range ambiguities by using equations (24b) and (27b to calculate k2−k3 and k1−k4, respectively, and use these quantities in equation (17e) to compute the DToF, which when multiplied with the speed of light, c, becomes the differential range.

In some embodiments, a range calculating STA, such as a PSTA may exclude or refrain from ranging with one or more STAs if an estimated distance between the one or more STAs or an estimated distance between the range calculating STA and the one or more STAs is greater than $R_{max}$=min$(R_{amb\_R}, R_{amb\_I})-R_{margin}$, where $R_{margin}$ is a margin term to account for possible errors in the prior knowledge in the position of the range calculating STA (e.g., PSTA) and the positions of the STAs (e.g., RSTA and/or IS TA(s), that the PSTA is ranging to) and min$(R_{amb\_R}, R_{amb\_I})$ represents the smaller value of $R_{amb\_R}$ and $R_{amb\_I}$. The margin $R_{margin}$ may be set to a value that mitigates the effect of these errors. $R_{amb\_R}$ and $R_{amb\_I}$ may be calculated using equations (18) and (19).

In some embodiments, a useful rule in the differential ranging case is for a PSTA to refrain from performing differential ranging to STAs—RSTA and/or ISTA(s)—that are farther away from the PSTA than $R_{max}$, and themselves are separated more than $R_{max}$. That is, under this rule, any STA involved in the differential ranging should not be more than $R_{max}$ away from another STA. The discussion above regarding the first device 301, the fourth device 304 and the fifth device 305 of FIG. 3 also illustrates some aspects of this rule.

In some embodiments, when $T_{stamp\_max}$ is large compared to or even about the same as the duration $T_{dur}$ of ranging exchanges in a RTT ranging or passive ranging event, the ambiguities in the timestamps may be resolved by noting that if the difference between any two timestamps is larger than the expected maximum duration $T_{dur}$, e.g., the expected maximum value of $t_{6\_P}-t_{1\_P}$, then the timestamp that is later in the sequence of timestamps wrapped in its timestamp representation, and a non-integer multiple of Ttimestamp max should be added to the calculated range (e.g., $R_{calc}$ in equation (7)). The duration $T_{dur}$ may correspond to the duration of the measurement sounding phase of a ranging event, and $T_{dur}$ may be set by one or more of the RSTA and ISTA and may be communicated to the other STAs.

In the example embodiments above, it was assumed that $T_{stamp\_max}$, the maximum possible value of a timestamp before it wraps back to zero, is the same for each of the timestamps. However, having the same $T_{stamp\_max}$ value for TOA and TOD timestamps may not be optimal. As an example, for passive TB ranging, it is generally desirable to use the minimum required number of bits for conveying the timestamps, as the timestamps (and their error measures) are likely transmitted in broadcast frames at somewhat low modulation and coding scheme (MCS) levels and may thus occupy many orthogonal frequency-division multiplexing (OFDM) symbols. Furthermore, the ISTAs may not be limited to reporting only the TOA of the NDPs they receive from the RSTA but may report the TOAs on the NDPs they receive from the other ISTAs that participate in the passive TB ranging operation in question. This means that the number of TOA timestamps that are exchanged could be significantly greater than the number of TOD timestamps that are exchanged. As such, it may be desirable to reduce the signaling overhead of the TOAs by optimizing the number of bits used in the reporting of the TOA timestamps.

In some embodiments, $T_{stamp\_max}$ TOA, the maximum possible value for representing TOA timestamps, may be less than $T_{stamp\_max}$ TOD, the maximum possible value for representing TOD timestamps. For example, a TOA timestamp may be represented by an n-bit value and a TOD timestamp may be represented by an m-bit value, where n<m. In some cases, n may be 16, and m may be 48. In some cases, the n may be 36, and m may be 48. These TOA timestamps may be referred to as "short timestamps," and these TOD timestamps may be referred to as "long timestamps."

The selection of $T_{stamp\_max}$ and the selection of timestamp resolution are generally considered together to arrive at an optimal or reasonable number of bits to represent the timestamps with. As an example, for a timestamp resolution of 128 ps and 16-bits representing the value of a timestamp, we get a maximum timestamp value of:

$$T_{stamp\_max}=(2^{16}-1)128^{-12} \text{ s} \approx 8.39 \text{ μs} \tag{28}$$

and, assuming (1+a) is 1, an approximate ambiguity value of:

$$R_{amb}=c \times T_{stamp\_max}/2 \approx 1.25 \text{ km} \tag{29}$$

When the short TOA timestamps and long TOD timestamps are used together during ranging, the resulting range ambiguity may be resolved by assuming the long TOD timestamps are non-ambiguous and expressing estimates of the long TOD timestamps as a function of the $T_{stamp\_max\_short}$, the maximum possible value for representing the short TOA timestamps. Consider the case in which the TOD timestamps are represented by 48 bits. Given that there are 48 bits to represent the TOD timestamp, spanning 218 seconds, it may be assumed that a reported TOD timestamp is an exact, non-ambiguous representation of the each measured TOD.

Take the TOD $t_{1\_I}$ for example and denote the non-ambiguous estimate of $t_{1\_I}$ as $t_{1\_I\_est}$, where the estimate $t_{1\_I\_est}$ that does not have any long timestamp ambiguity wrapping with respect to the $t_{4\_J}$ timestamp, which is being estimated. From the long timestamp $t_{1\_I\_lr}$ reported for $t_{1\_I}$, a virtual reported short timestamp $t_{1\_I\_r}$ for $t_{1\_I\_lr}$ may be expressed as:

$$t_{1\_I\_r}=t_{1\_I\_lr} \bmod T_{stamp\_max\_short} \tag{30}$$

The estimate $t_{1\_I\_est}$ can then be expressed as:

$$t_{1\_I\_est}=k1 \times T_{stamp\_max\_short}+t_{1\_I\_r} \tag{31a}$$

and k1 can be solved for as:

$$k1=(t_{1\_I\_est}-t_{1\_I\_r})/T_{stamp\_max\_short} \tag{31b}$$

Since there is a way to estimate k4-k1 with k1mk4_int_est, as described earlier (e.g., equation (27b) with $T_{stamp\_max}=T_{stamp\_max\_short}$ and the Matlab code), k4 can be estimated by:

$$k4_{est}=k1-k1mk4\_int\_est \tag{32}$$

and the non-ambiguous estimate of $t_{4\_I\_est}$ can be calculated as:

$$t_{4\_I\_est}=k4_{est} \times T_{stamp\_max\_short}+t_{4\_R\_r} \tag{33}$$

Applying the same "non-ambiguous" assumption to $t_{3\_R}$ and a similar mathematical process, the PSTA can also calculate $t_{3\_R\_est}$ and $t_{2\_R\_est}$:

$$t_{3\_R\_r}=t_{3\_R\_lr} \bmod T_{stamp\_max\_short} \tag{34}$$

$$t_{3\_R\_est}=k3 \times T_{stamp\_max\_short}+t_{3\_R\_r} \tag{35a}$$

$$k3=(t_{3\_R\_est}-t_{3\_R\_r})/T_{stamp\_max\_short} \tag{35b}$$

$$k2_{est}=k3+k2mk3\_int\_est \tag{36}$$

$$t_{2\_R\_est}=k2_{est} \times T_{stamp\_max\_short}+t_{2\_R\_r} \tag{37}$$

where:

$t_{3\_R\_lr}$ is the reported timestamp for $t_{3\_R}$;
$t_{3\_R\_r}$ is a virtual reported short timestamp for $t_{3\_R\_lr}$;
$t_{3\_R\_est}$ is an estimate of $t_{3\_R}$ that does not have any long timestamp ambiguity wrapping with respect to the $t_{2\_R}$ timestamp;
$k2_{est}$ is an estimate of k2 based on k2mk3_int_est, which can be estimated using equation (24b) and the Matlab code; and
$t_{2\_R\_est}$ is an estimate of the ambiguous TOA timestamp for $t_{2\_R}$.

With these values in hand, the PTSA can apply equation (17e) to calculate the DToF as follows:

$$\begin{aligned}DToF=&t_{6\_P}-t_{5\_P}+0.5(1+a_R)(t_{2\_R\_est}-t_{3\_R\_lr})+0.5(1+a_I)\\&(t_{1\_I\_lr}-t_{4\_I\_est})+0.5(1+a_R)(k2_{est}-k3)\\&T_{stamp\_max\_short}+0.5(1+a_I)(k1-k4_{est})\\&T_{stamp\_max\_short}\end{aligned} \tag{38}$$

Figure 5:
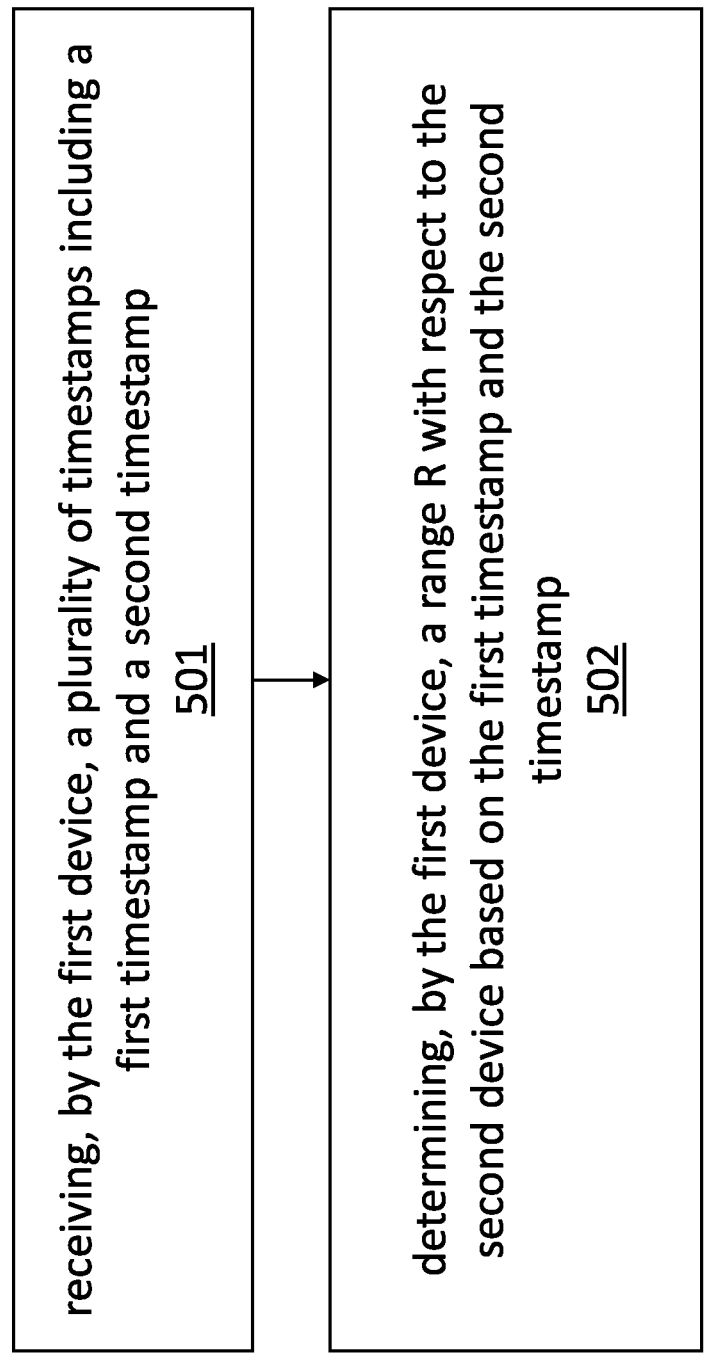
FIG. 5 illustrates a flowchart of a method by a first device for performing ranging with a second device, according to an embodiment.

FIG. 5 illustrates a flowchart of a method by a first device for performing ranging with a second device, according to an embodiment. At 501, the first device receives a plurality of timestamps including a first timestamp and a second timestamp. The first device may include an antenna for receiving one or more wireless signals containing the plurality of timestamps. The first timestamp may indicate a TOA of a first wireless signal arriving at the second device, a maximum possible value of the first timestamp being $T_{max1}$. The second timestamp may indicate a TOD of a second wireless signal departing from the second device, a maximum possible value of the second timestamp being $T_{max2}$ and greater than $T_{max1}$. At 502, the first device determines a range R with respect to the second device by calculating an average time-of-flight (TOF) of the first wireless signal and the second wireless signal based on the first timestamp and the second timestamp.

Figure 6:
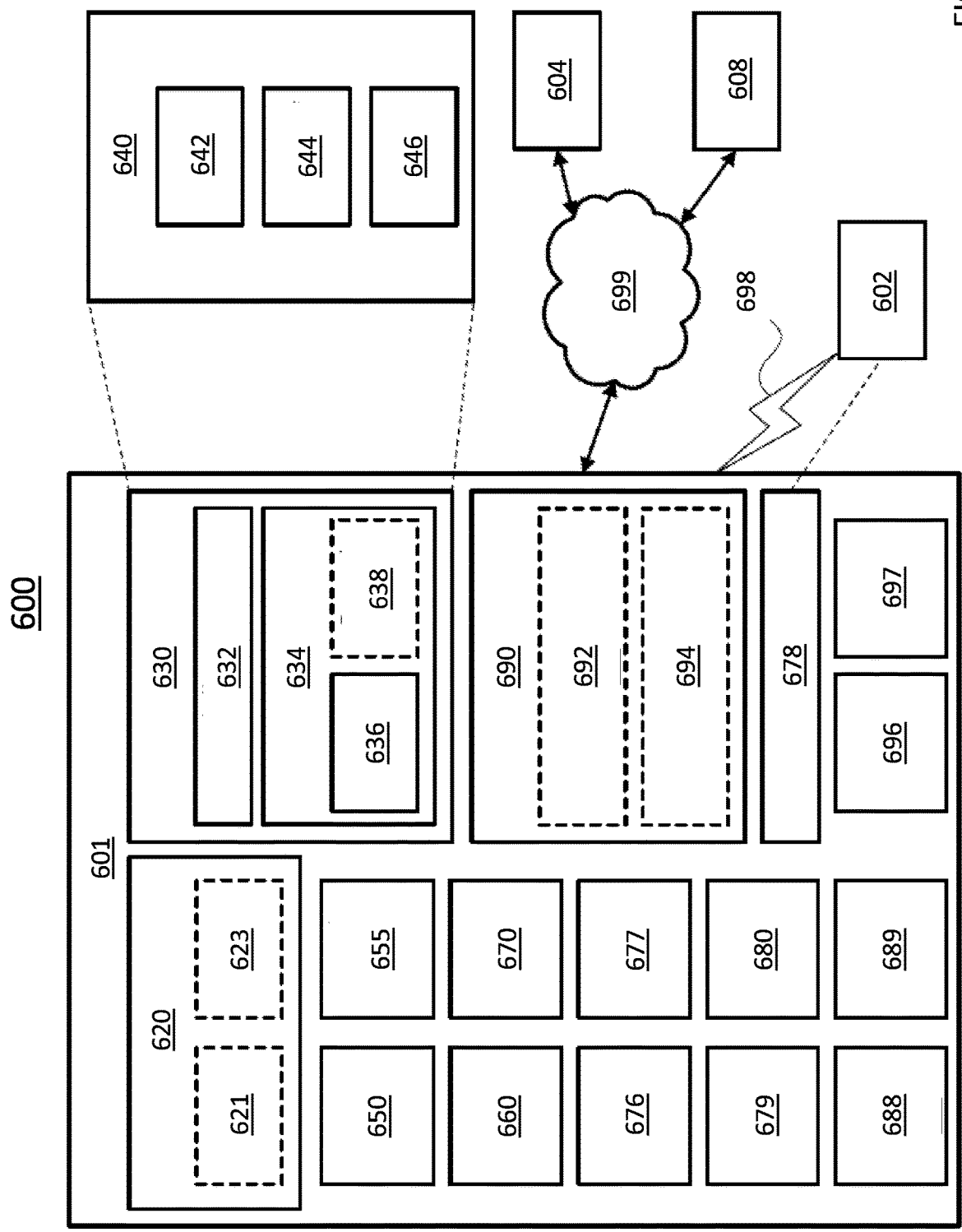
FIG. 6 illustrates a block diagram of an electronic device in a network environment, according to one embodiment.

FIG. 6 illustrates a block diagram of an electronic device 601 in a network environment 600, according to one embodiment, that may be used to implement one or more of the devices describe herein. Referring to FIG. 6, the electronic device 601 in the network environment 600 may communicate with an external electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, and/or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display), or the display device 660 may include one or more sensors in addition to the sensor module 676.

The processor 620 may execute, for example, software (e.g., a program 640) to control at least one other component (e.g., a hardware or a software component) of the electronic device 601 coupled with the processor 620, and may perform various data processing and/or computations. As at least a part of the data processing and/or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, and/or execute a particular function. The auxiliary processor 623 may be implemented as being separate from, or as a part of, the main processor 621. The processor 620 may include a ranging processor, for example, implemented as an ASIC for performing ranging calculations.

The auxiliary processor 623 may control at least some of the functions or states related to at least one component (e.g., the display device 660, the sensor module 676, or the communication module 690) from among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as a part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 and/or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, and/or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or as a part of, the speaker.

The display device 660 may visually provide information to the outside (e.g., a user) of the electronic device 601. The display device 660 may include, for example, a display, a hologram device, and/or a projector and control circuitry to control a corresponding one of the display, the hologram device, and the projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, and/or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 and/or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, and/or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, and/or an audio connector (e.g., a headphone connector).

The haptic module 679 may convert an electrical signal into a mechanical stimulus (e.g., a vibration or a movement) and/or an electrical stimulus which may be recognized by a user via tactile sensation or kinesthetic sensation. According to one embodiment, the haptic module 679 may include, for example, a motor, a piezoelectric element, and/or an electrical stimulator.

The camera module 680 may capture a still image or moving images. According to one embodiment, the camera module 680 may include one or more lenses, image sensors, image signal processors, and/or flashes.

The power management module 688 may manage power supplied to the electronic device 601. The power management module 688 may be implemented as at least a part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, and/or a fuel cell.

The communication module 690 may support establishing a direct (e.g., wired) communication channel or a wireless communication channel between the electronic device 601 and the external electronic device (e.g., the external electronic device 602, the external electronic device 604, and/or the server 608) and performing communication via the established communication channel. The communication module 690 may include one or more communication processors that are operable independently from the processor 620 (e.g., the AP) and may support a direct (e.g., wired) communication and/or a wireless communication. According to one embodiment, the communication module 690 may include a wireless communication module 692 (e.g., a cellular communication module, a short-range wireless communication module, and/or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth®, wireless-fidelity (Wi-Fi) direct, and/or a standard of the Infrared Data Association (IrDA)) or the second network 699 (e.g., a long-range communication network, such as a cellular network, the Internet, and/or a computer network (e.g., LAN or wide area network (WAN)). Bluetooth® is a registered trademark of Bluetooth SIG, Inc., Kirkland, Wash. These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit and/or receive a signal and/or power to and/or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 and/or the second network 699, may be selected, for example, by the communication module 690 (e.g., the wireless communication module 692). The signal and/or the power may then be transmitted and/or received between the communication module 690 and the external electronic device via the selected at least one antenna.

At least some of the above-described components may be mutually coupled and communicate signals (e.g., commands and/or data) therebetween via an inter-peripheral communication scheme (e.g., a bus, a general purpose input and output (GPIO), a serial peripheral interface (SPI), and/or a mobile industry processor interface (MIPI)).

According to one embodiment, commands and/or data may be transmitted and/or received between the electronic device 601 and the external electronic device 604 via the server 608 coupled with the second network 699. Each of the electronic devices 602 and 604 may be a device of a same type as, or a different type from, the electronic device 601. All or some of operations to be executed at or by the electronic device 601 may be executed at one or more of the external electronic devices 602, 604, or 608. For example, if the electronic device 601 should perform a function and/or a service automatically, or in response to a request from a user or another device, the electronic device 601, instead of, or in addition to, executing the function and/or the service, may request the one or more external electronic devices to perform at least a part of the function and/or the service. The one or more external electronic devices receiving the request may perform the at least a part of the function and/or the service requested, and/or an additional function and/or an additional service related to the request, and transfer an outcome of the performing to the electronic device 601. The electronic device 601 may provide the outcome, with or without further processing of the outcome, as at least a part of a reply to the request. To that end, a cloud computing, distributed computing, and/or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the spirit or scope of the present disclosure. Thus, the scope of the present disclosure shall not be determined merely based on the described embodiments, but rather determined based on the accompanying claims and equivalents thereof.

What is claimed is:

1. A first device that performs ranging with respect to a second device, the first device comprising:
an antenna that:
receives wireless signals including a plurality of timestamps including a first timestamp represented by an n-bit value and a second timestamp represented by an m-bit value, wherein n<m,
the first timestamp indicating a time-of-arrival (TOA) of a first wireless signal arriving at the second device, and
the second timestamp indicating a time-of-departure (TOD) of a second wireless signal departing from the second device; and
a ranging processor that determines a range R with respect to the second device by calculating an average time-of-flight (TOF) of the first wireless signal and the second wireless signal based on the first timestamp and the second timestamp, wherein the range R corresponds to a measured distance between the first device and the second device, and
wherein the first device:
sends the first wireless signal to the second device,
receives the second wireless signal from the second device, and
determines a range ambiguity $R_{amb}$ based on a maximum possible value of the first timestamp, and
wherein determining the range R includes:
calculating a calculated range $R_{calc}$ based on the first timestamp and the second timestamp, and
identifying an integer k such that $R=k*R_{amb}+R_{calc}$ is within an interval $[-R_{err}, R_{amb}-R_{err}]$, where $R_{err}$ is a maximum measurement error associated with the ranging.

2. A first device that performs ranging with respect to a second device, the first device comprising:
an antenna that:
receives wireless signals including a plurality of timestamps including a first timestamp represented by an n-bit value and a second timestamp represented by an m-bit value, wherein n<m,
the first timestamp indicating a time-of-arrival (TOA) of a first wireless signal arriving at the second device, and
the second timestamp indicating a time-of-departure (TOD) of a second wireless signal departing from the second device; and
a ranging processor that determines a range R with respect to the second device by calculating an average time-of-flight (TOF) of the first wireless signal and the second wireless signal based on the first timestamp and the second timestamp, wherein the range R corresponds to a measured distance between the first device and the second device, and
wherein the first device:
sends the first wireless signal to the second device;
receives the second wireless signal from the second device;
determines a range ambiguity $R_{amb}$ based on a maximum possible value of the first timestamp;
estimates a range $R_C$ between the first device and another deviceeˍ;

determines that the other device is too far away such that an integer k cannot be uniquely solved for an estimated range $R_{est}=k*R_{amb}+R_C$ in which $R_{est}$ is within an interval $[-R_{err}, R_{amb}-R_{err}]$, where $R_{err}$ is a maximum measurement error associated with the ranging; and
refrains from further ranging with the other device.

3. A first device that performs ranging with respect to a second device, the first device comprising:
an antenna that:
receives wireless signals including a plurality of timestamps including a first timestamp represented by an n-bit value and a second timestamp represented by an m-bit value, wherein n<m,
the first timestamp indicating a time-of-arrival (TOA) of a first wireless signal arriving at the second device, and
the second timestamp indicating a time-of-departure (TOD) of a second wireless signal departing from the second device; and
a ranging processor that determines a range R with respect to the second device by calculating an average time-of-flight (TOF) of the first wireless signal and the second wireless signal based on the first timestamp and the second timestamp,
wherein the plurality of timestamps further includes a third timestamp indicating a TOD of the first wireless signal departing from a third device and a fourth timestamp indicating a TOA of the second wireless signal arriving at the third device, and
the range R is a differential range corresponding to a difference between a distance from the first device to the second device and a distance from the first device to the third device, and
wherein the first device:
determines, based on a maximum possible value of the first timestamp, a first-range ambiguity $R_{amb1}$ and a second range ambiguity $R_{amb2}$;
wherein determining the range R includes:
calculating a calculated range $R_{calc}$ based on the first timestamp, the second timestamp, the third timestamp, and the fourth timestamp; and
estimating integers $k_1$ and $k_2$ for the range $R=k_1*R_{amb1}+k_2*R_{amb2}+R_{calc}$, based on approximations that:
equate a TOA of the first wireless signal arriving at the first device to the TOA of the first wireless signal arriving at the second device and to the TOD of the first wireless signal departing from the third device, and
equate a TOA of the second wireless signal arriving at the first device to the TOD of the second wireless signal departing from the second device and to the TOA of the second wireless signal arriving at the third device.

4. The first device of claim 3 that:
estimates a first range $R_{C1}$ between the first device and a fourth device, a second range $R_{C2}$ between the first device and a fifth device, and a third range $R_{C3}$ between the fourth device and the fifth device;
determines that one or more of $R_{C1}$, $R_{C2}$, and $R_{C3}$ is greater than $R_{max}=\min(R_{amb1}, R_{amb2})-R_{margin}$, where $R_{margin}$ is a margin value that accounts for errors in measurements of one or more of ranges $R_{C1}$, $R_{C2}$, and $R_{C3}$; and
refrains from further ranging with the fourth and fifth devices as a pair.

5. The first device of claim 4 that estimates the first range $R_{C1}$, the second range $R_{C2}$ and the third range $R_{C3}$ based on known locations of the fourth and fifth devices and an approximate location estimate of the first device.

6. The first device of claim 3 that:
receives, from the second device, an indication of a maximum ranging exchange duration $T_{dur}$; and
determines that the maximum possible value of the first timestamp is greater than $T_{dur}$,
wherein determining the range R includes:
determining that an absolute value of a difference between two timestamps of the plurality of timestamps exceeds $T_{dur}$, and
incrementing a later of the two timestamps by a non-integer multiple of the maximum possible value of the first timestamp.

* * * * *